United States Patent
Lee et al.

(10) Patent No.: US 8,971,410 B2
(45) Date of Patent: Mar. 3, 2015

(54) METHOD, APPARATUS AND COMPUTER-READABLE MEDIUM PROCESSING FRAMES OBTAINED BY MULTIPLE EXPOSURES

(75) Inventors: Kyoung Mu Lee, Seoul (KR); Young Su Moon, Seoul (KR); Yong Seok Heo, Seoul (KR); Joon Hyuk Cha, Incheon (KR); Shi Hwa Lee, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 488 days.

(21) Appl. No.: 13/067,414

(22) Filed: May 31, 2011

(65) Prior Publication Data

US 2011/0310970 A1 Dec. 22, 2011

(30) Foreign Application Priority Data

Jun. 18, 2010 (KR) .................. 10-2010-0058255

(51) Int. Cl.
  *H04N 11/02* (2006.01)
  *H04N 19/583* (2014.01)
  *H04N 19/527* (2014.01)
  *H04N 19/86* (2014.01)

(52) U.S. Cl.
  CPC ... *H04N 19/00733* (2013.01); *H04N 19/00593* (2013.01); *H04N 19/00909* (2013.01)
  USPC .................................................. 375/240.16

(58) Field of Classification Search
  USPC ........................................ 375/240.01–240.29
  See application file for complete search history.

(56) References Cited

U.S. PATENT DOCUMENTS

| | | | |
|---|---|---|---|
| 2004/0150641 A1* | 8/2004 | Duiker | 345/426 |
| 2006/0088207 A1* | 4/2006 | Schneiderman | 382/159 |
| 2010/0296701 A1* | 11/2010 | Hu | 382/103 |
| 2011/0254976 A1* | 10/2011 | Garten | 348/229.1 |
| 2012/0050474 A1* | 3/2012 | Segall | 348/43 |

FOREIGN PATENT DOCUMENTS

| | | |
|---|---|---|
| JP | 07-113174 | 5/1995 |
| JP | 2006-139579 | 6/2006 |
| JP | 2008-054206 | 3/2008 |
| JP | 2009-118520 | 5/2009 |
| JP | 2010-015469 | 1/2010 |
| KR | 10-2006-0105809 | 10/2006 |
| KR | 10-2009-0102556 | 9/2009 |

* cited by examiner

*Primary Examiner* — Dave Czekaj
*Assistant Examiner* — Leron Beck
(74) *Attorney, Agent, or Firm* — Staas & Halsey LLP

(57) ABSTRACT

A method of processing frames obtained by multiple exposures may include categorizing, by at least one processor, a plurality of frames captured by multiple exposures into one of a reference frame and a target frame, compensating for global motion resulting from motion of a capturing apparatus capturing an object, and compensating for local motion resulting from motion of the object, based on a joint histogram between the reference frame and the target frame.

13 Claims, 8 Drawing Sheets

METHOD, APPARATUS AND COMPUTER-READABLE MEDIUM PROCESSING FRAMES OBTAINED BY MULTIPLE EXPOSURES

CROSS-REFERENCE TO RELATED APPLICATIONS

This application claims the benefit of Korean Patent Application No. 10-2010-0058255, filed on Jun. 18, 2010, in the Korean Intellectual Property Office, the disclosure of which is incorporated herein by reference.

BACKGROUND

1. Field

Example embodiments of the following description relate to a method, apparatus and computer-readable medium processing frames obtained by multiple exposures, and more particularly, to a method, apparatus and computer-readable medium processing frames obtained by multiple exposures that may compensate for motion of a capturing apparatus and motion of an object, and may remove ghost pixels.

2. Description of the Related Art

High Dynamic Range (HDR) technology is used to generate a single HDR image using image frames captured by different exposures. An HDR image is usually created in a fixed environment including a fixed camera and a stationary object. However, most users capture a moving object while holding a camera with their hands. Accordingly, there is a desire to generate a single HDR image of a moving object from a hand-held camera as if the hand-held camera were a fixed camera capturing a stationary object, by compensating for motions of consecutive exposure frames captured when both the camera and the object are in motion.

SUMMARY

The foregoing and/or other aspects are achieved by providing a method of processing frames obtained by multiple exposures, the method including categorizing, by at least one processor, a plurality of frames into one of a reference frame and a target frame, the plurality of frames captured by multiple exposures, compensating for global motion resulting from motion of a capturing apparatus capturing an object, and compensating for local motion based on a joint histogram between the reference frame and the target frame, the local motion resulting from motion of the object.

The compensating for the local motion may include generating a joint histogram of an intensity between the reference frame and the target frame, normalizing the generated joint histogram and computing a joint probability of the target frame for each pixel, and comparing the computed joint probability to a threshold and detecting ghost pixels.

The generated joint histogram may represent a result obtained by accumulating a number of pairs of intensity values of pixels at a same location in the reference frame and the target frame. The normalizing of the generated joint histogram may include dividing the number of pairs of intensity values by a pixel size of the reference frame, and computing the joint probability.

The comparing of the computed joint probability may include defining ghost pixels when the computed joint probability is less than the threshold.

The compensating for the local motion may further include removing a false-positive pixel from the detected ghost pixels and detecting an actual ghost pixel, and removing the detected actual ghost pixel from the target frame and compensating for the local motion.

The compensating for the local motion may include dividing the target frame into an R channel frame, a G channel frame, and a B channel frame, and compensating for the local motion based on a joint histogram for the R channel frame, the G channel frame, and the B channel frame.

The categorizing of the plurality of frames may include selecting, as the reference frame, one of a frame corresponding to an intermediate exposure among the multiple exposures, a frame having an intensity value closest to a median intensity value of an average intensity value of the frames, and a frame having a largest entropy among the frames.

The compensating for the global motion may include compensating for the global motion existing between the frames, and matching the frames together.

The foregoing and/or other aspects are achieved by providing an apparatus to process frames obtained by multiple exposures, the apparatus including a categorization unit to categorize a plurality of frames into one of a reference frame and a target frame, the plurality of frames captured by multiple exposures, a global motion compensation unit to compensate for global motion resulting from motion of a capturing apparatus capturing an object, and a local motion compensation unit to compensate for local motion based on a joint histogram between the reference frame and the target frame, the local motion resulting from motion of the object.

The local motion compensation unit may include a histogram generator to generate a joint histogram of an intensity between the reference frame and the target frame, a probability computation unit to normalize the generated joint histogram and to compute a joint probability of the target frame for each pixel, and a ghost pixel detector to compare the computed joint probability to a threshold and to detect ghost pixels.

The generated joint histogram may represent a result obtained by accumulating a number of pairs of intensity values of pixels at a same location in the reference frame and the target frame. The probability computation unit may divide the number of pairs of intensity values by a pixel size of the reference frame, and may compute the joint probability.

The ghost pixel detector may define a computed pixel as a ghost pixel, when the computed joint probability is less than the threshold.

The ghost pixel detector may remove a false-positive pixel from detected ghost pixels, and may detect an actual ghost pixel. The local motion compensation unit may further include a motion matching unit to remove the detected actual ghost pixel from the target frame and to match the local motion.

The foregoing and/or other aspects are achieved by providing a method including removing effects, by at least one processor, of global and local motion from a plurality of frames captured from multiple exposures of a high dynamic range image (HDR) by an apparatus, the global motion resulting from movement of the apparatus and the local motion resulting from movement of the object and causing ghost pixels.

Additional aspects, features, and/or advantages of example embodiments will be set forth in part in the description which follows and, in part, will be apparent from the description, or may be learned by practice of the disclosure.

According to another aspect of one or more embodiments, there is provided at least one non-transitory computer readable medium including computer readable instructions that control at least one processor to implement methods of one or more embodiments.

The example embodiments may include a method apparatus and computer-readable medium processing frames obtained by multiple exposures that may more accurately detect a ghost area using a joint histogram and an energy minimization scheme. In other words, it is possible to provide various functions with greater clarity and high-performance using consecutive frames continuously captured by different exposures, by effectively removing an image degradation phenomenon (for example, a blurring phenomenon, or a ghost phenomenon) caused by a motion of a capturing apparatus and a motion of an object. Additionally, it is possible to minimize a memory size and computing resources by more accurately removing ghost pixels.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
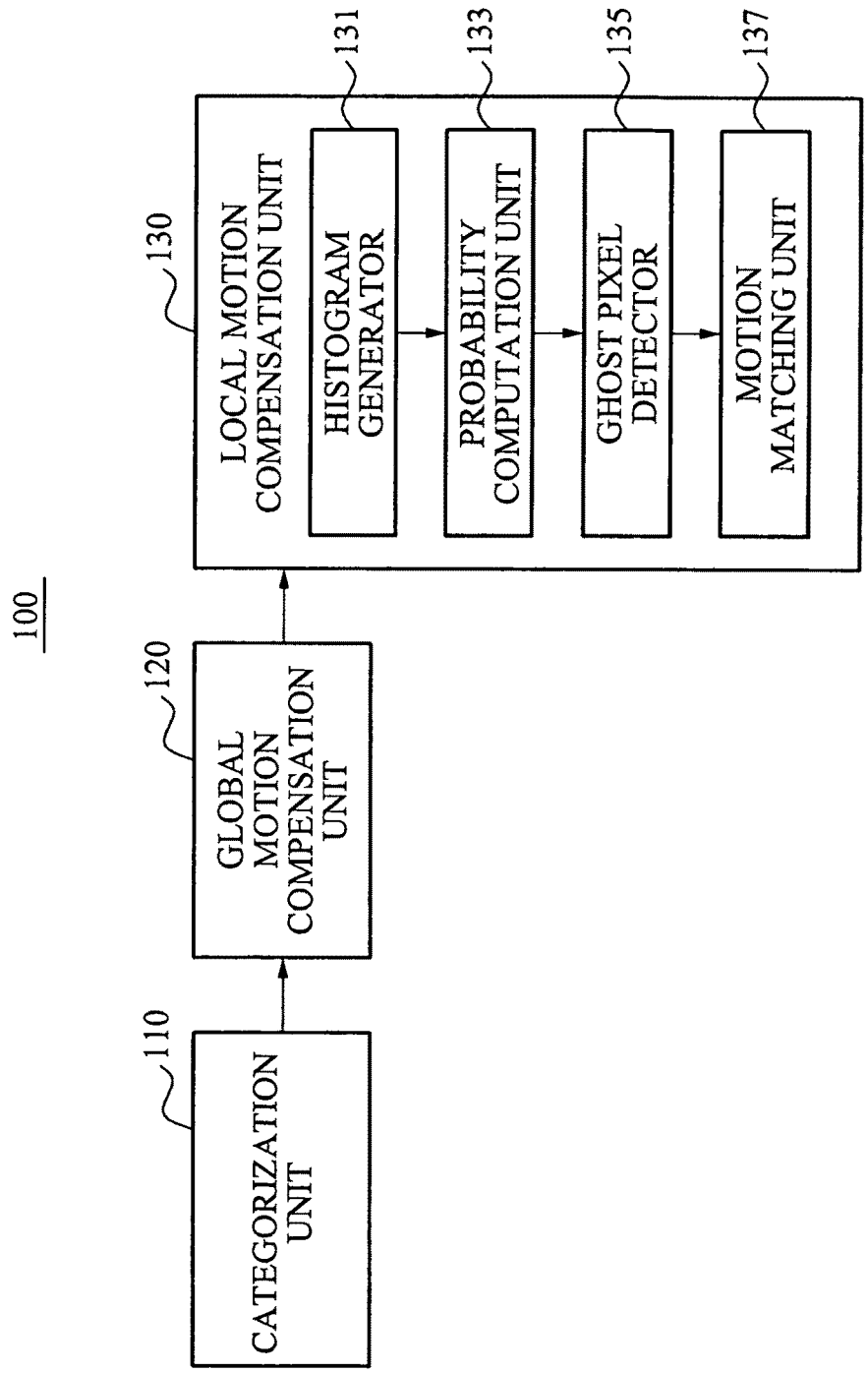
FIG. 1 illustrates a block diagram of a frame processing apparatus to process frames obtained by multiple exposures according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

Figure 2:
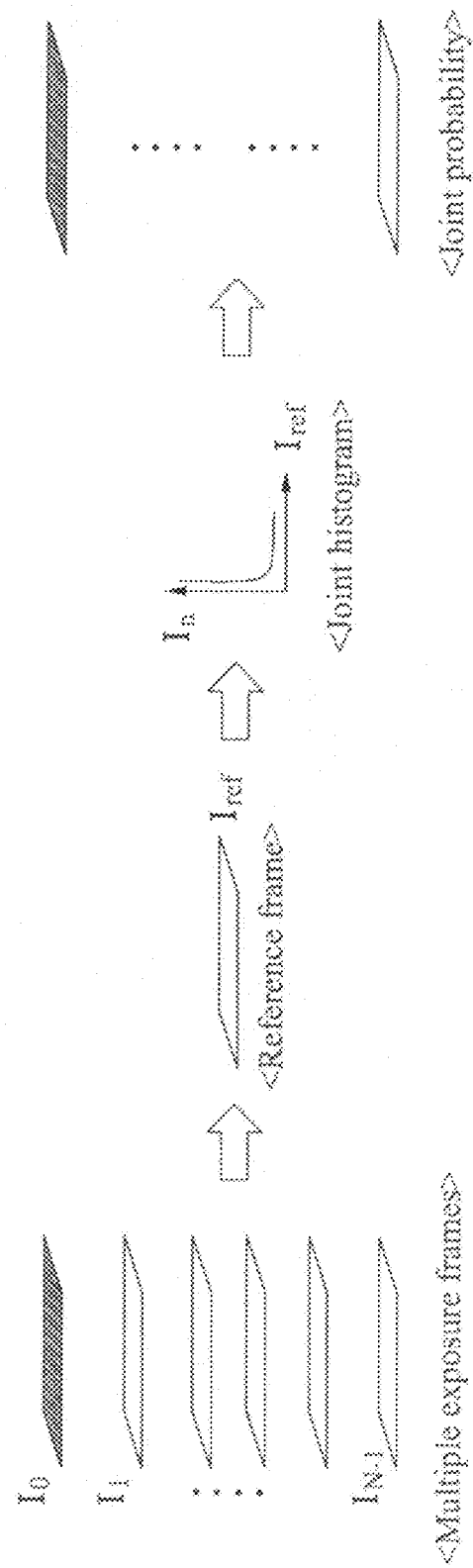
FIG. 2 illustrates a diagram of an example of processing frames in the frame processing apparatus of FIG. 1.

FIG. 1 illustrates a block diagram of a frame processing apparatus 100 processing frames obtained by multiple exposures according to example embodiments, and FIG. 2 illustrates a diagram of an example of processing frames in the frame processing apparatus 100 of FIG. 1.

The frame processing apparatus 100 of FIG. 1 may perform geometric matching between consecutive frames while varying an exposure. The geometric matching may be included in a preprocessing operation to implement High Dynamic Range imaging (HDR).

In other words, when a capturing apparatus captures an object, the frame processing apparatus 100 may compensate for global motion caused by motion of the capturing apparatus, and local motion caused by motion of the object. As a result, the frame processing apparatus 100 may provide consecutive frames that seem as if the consecutive frames are obtained while both the capturing apparatus and the object are stationary. In other words, by assuming that the capturing apparatus and the object in motion are stationary, an HDR algorithm may be applied to the consecutive frames, so that an HDR image may be generated. Accordingly, the frame processing apparatus 100 may include a categorization unit 110, a global motion compensation unit 120, and a local motion compensation unit 130.

Referring to FIG. 2, the capturing apparatus may continuously capture the object with multiple exposures, and may provide the categorization unit 110 with N frames $I_0, I_1, \ldots,$ and $I_{N-1}$ (here, N=1, 2, ..., and n) that respectively correspond to the multiple exposures.

The categorization unit 110 may categorize the N frames $I_0, I_1, \ldots,$ and $I_{N-1}$ captured by the multiple exposures into one of a reference frame $I_{ref}$ and a target frame. The categorization unit 110 may select, as the reference frame $I_{ref}$, a frame having a best visibility among the N frames $I_0, I_1, \ldots,$ and $I_{N-1}$.

Specifically, the categorization unit 110 may select, as a reference frame, either a frame corresponding to an intermediate exposure among the multiple exposures, or a frame best representing content of an image among the consecutive frames. The frame best representing the content of the image may be one of a frame having an intensity value closest to a median intensity value of an average intensity value of the frames, a frame having a largest entropy among frames, and a frame having a largest edge size of the image. Accordingly, the categorization unit 110 may select, as a reference frame, a frame satisfying one of the above conditions, and may set other frames as target frames. When an intensity value is from 0 to 255, the median intensity value may be '128' obtained by '(0+255)/2'.

The global motion compensation unit 120 may compensate for global motion. Specifically, the global motion compensation unit 120 may extract image motion information between the frames, may estimate a global motion model, may compensate for global motion existing between the frames based on the estimated motion model, and may match the frames. Accordingly, the global motion compensation unit 120 may output frames that are recognized as if the frames are obtained by the capturing apparatus continuously capturing the object as if the capturing apparatus is stationary or fixed. The output frames may include the reference frame and target frames.

According to example embodiments, the global motion compensation unit 120 may generate a Median Threshold Bitmap (MTB) image having no change in exposure from multiple exposure frames. Additionally, the global motion compensation unit 120 may estimate a global motion using the generated MTB image, and may perform global image matching based on the estimated global motion.

According to example embodiments, the global motion compensation unit 120 may estimate a homography matrix that is a transformation model between two consecutive frames, using a Scale Invariant Feature Transform (SIFT) scheme and a RANdom SAmple Consensus (RANSAC) scheme. Additionally, the global motion compensation unit 120 may compensate for global motion existing between the two consecutive frames using the estimated homography matrix.

The local motion compensation unit 130 may compensate for local motion based on a joint histogram between the reference frame and the target frame. Specifically, the local motion compensation unit 130 may compensate for a vibration occurring in a local area by the motion of the object, in each of the target frames. Accordingly, the local motion compensation unit 130 may output frames that are recognized as if the frames are obtained by continuously capturing the object and assuming that both the capturing apparatus and the object are stationary and not in motion.

Additionally, the local motion compensation unit 130 may divide the target frame into an R channel frame, a G channel frame, and a B channel frame, and may compensate for the local motion based on a joint histogram for the R channel frame, the G channel frame and the B channel frame.

Accordingly, the local motion compensation unit 130 may include a histogram generator 131, a probability computation unit 133, a ghost pixel detector 135, and a motion matching unit 137.

The histogram generator 131 may generate a joint histogram of an intensity between the reference frame and the target frame. The histogram generator 131 may generate a two-dimensional (2D) joint histogram for each intensity of the R channel frame, the G channel frame and the B channel frame.

The histogram generator 131 may generate a joint histogram between the reference frame and the target frame using the following Equation 1:

$$H_{I_0^c I_1^c}(l,m) = \Sigma_p T[(l,m) = (I_0^c(p), I_1^c(p))] \quad \text{[Equation 1]}$$

In Equation 1, $I_0^c$ denotes a reference frame, $I_1^c$ denotes a target frame and $c \in \{R,G,B\}$, and $I^c(p)$ denotes an intensity value of pixel p located in $I^c$. Additionally, I and m in denote intensities, and respectively have a value of $l \in [0, 255]$, and a value of $m \in [0, 255]$. When an argument in a square bracket of $T[\bullet]$ is true, $T[\bullet]$ may have a value of '1'. In other cases, $T[\bullet]$ may be a function returning '0'. An example of generating a 2D joint histogram is illustrated in FIGS. 3 and 4.

Figure 3:
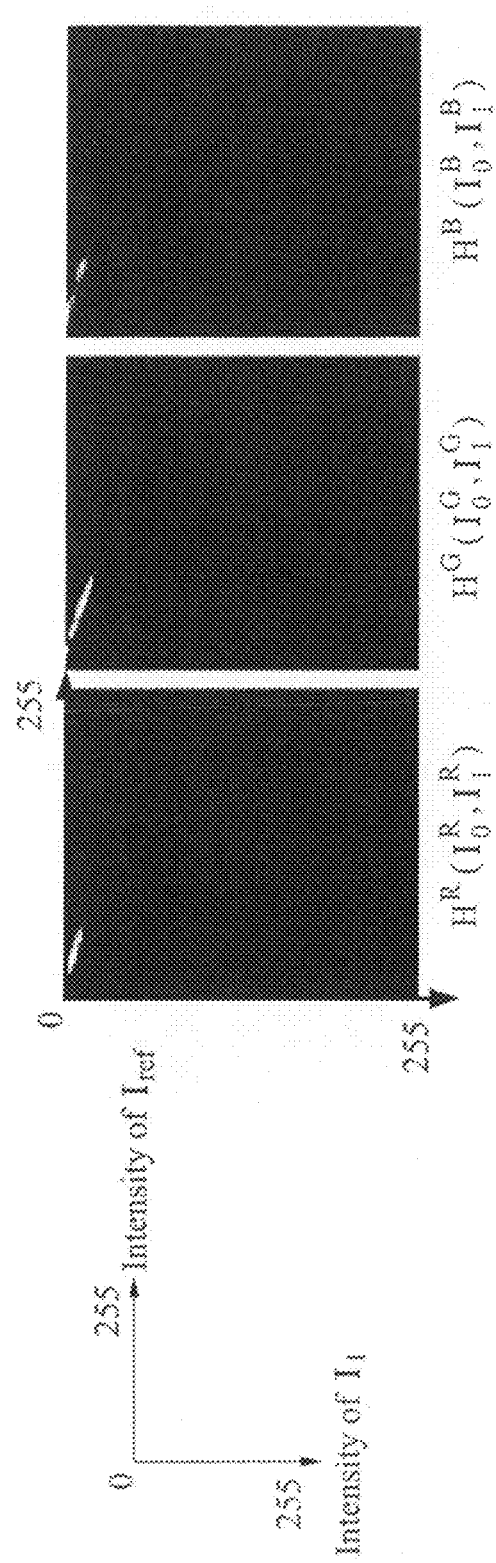
FIGS. 3 and 4 illustrate examples of a joint histogram for an R channel frame, a G channel frame and a B channel frame according to example embodiments.
Figure 4:
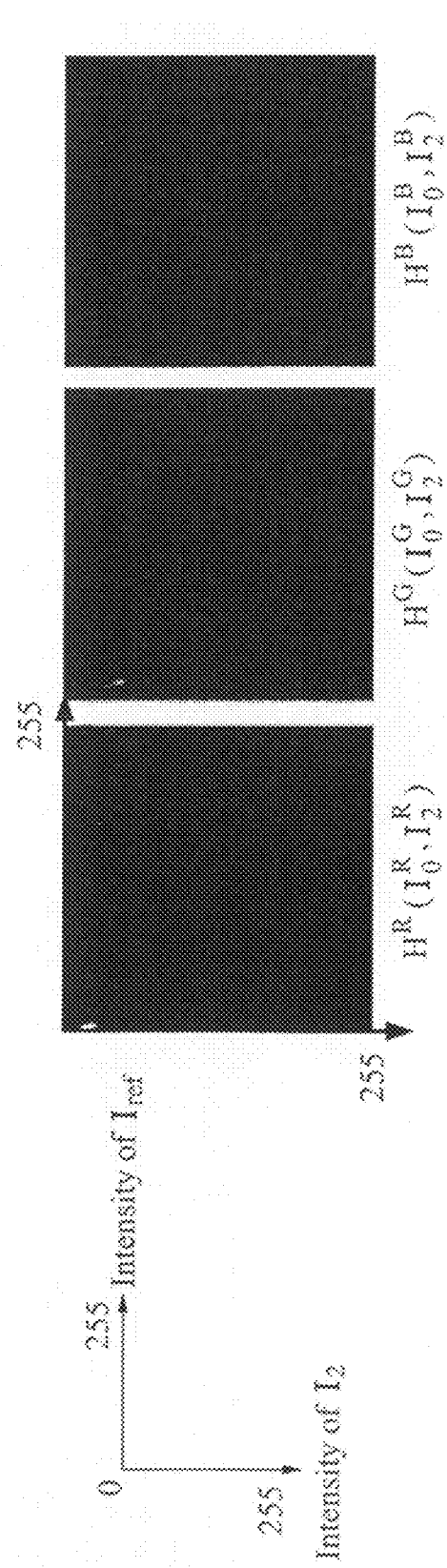

FIGS. 3 and 4 illustrate examples of a joint histogram for an R channel frame, a G channel frame and a B channel frame.

Referring to FIG. 3, $I_0$ denotes a reference frame $I_{ref}$ and $I_1$ denotes a target frame. Additionally, $H^R(I_0^R, I_1^R)$ denotes a joint histogram between the reference frame and the R channel frame of the target frame, $H^G(I_0^G, I_1^G)$ denotes a joint histogram between the reference frame and the G channel frame, and $H^B(I_0^B, I_1^B)$ denotes a joint histogram between the reference frame and the B channel frame.

Referring to FIG. 4, $I_0$ denotes a reference frame $I_{ref}$ and $I_2$ denotes a target frame. Additionally, $H^R(I_0^R, I_2^R)$ denotes a joint histogram between the reference frame and the R channel frame of the target frame, $H^G(I_0^G, I_2^G)$ denotes a joint histogram between the reference frame and the G channel frame, and $H^B(I_0^B, I_2^B)$ denotes a joint histogram between the reference frame and the B channel frame.

The joint histogram may represent a result obtained by accumulating a number of pairs of intensity values of pixels at a same location in the reference frame and the target frame. Specifically, a joint histogram may be generated by defining an x axis as an intensity of the reference frame, by defining a y axis as an intensity of the target frame, and by accumulating, in a z axis, a pair of an intensity value of a pixel at a coordinate (x, y) of the reference frame and an intensity value of a pixel at a coordinate (x, y) of the target frame. As shown in FIGS. 3 and 4, a lighter color is used to indicate accumulation of a large number of pairs of intensity values.

Referring back to FIG. 1, the probability computation unit 133 may normalize the joint histogram generated by the histogram generator 131, and may compute a joint probability of the target frame for each pixel. To convert a joint histogram into a joint probability, the probability computation unit 133 may sequentially perform a Parzen window operation and a normalization operation with respect to the joint histogram.

Accordingly, the probability computation unit 133 may set a sigma value of a 2D Gaussian filter to be '1', and may perform a 2D Gaussian filtering operation. Additionally, the probability computation unit 133 may divide, by a pixel size, an accumulated result stored in all bins of the joint histogram, so that the total sum of computed joint probabilities may be '1'. In other words, the probability computation unit 133 may divide the number of pairs of intensity values accumulated in the joint histogram by a pixel size of the reference frame, and may compute the joint probability. The pixel size of the reference frame may correspond to a number of all pixels.

For example, when 100 pairs of intensity values are accumulated in a position corresponding to '(Intensity of $I_0$, Intensity of $I_{01}$)=(10, 30)' in $H^R(I_0^R, I_1^R)$ of FIG. 3, and when a pixel size has a value of '10000', the probability computation unit 133 may compute a joint probability of '0.01' obtained by '100/10000=0.01'.

The ghost pixel detector 135 may compare the joint probability computed by the probability computation unit 133 to a threshold that is set in advance, and may detect initial ghost pixels or an initial ghost area from the target frame. Hereinafter, the initial ghost pixel may be used. An example of a ghost pixel may be a portion of an image generated by capturing an extremely bright light source such as the sun, and may reduce clarity of an image.

The ghost pixel detector 135 may detect initial ghost pixels using the following Equation 2:

$$ghostW(x, y, I_i) = \begin{cases} 0, & \text{if } P^R(I_0^R(x, y), I_i^R(x, y)) < C \text{ or} \\ & P^G(I_{ref}^G(x, y), I_i^G(x, y)) < C \text{ or} \\ & P^B(I_{ref}^B(x, y), I_i^B(x, y)) < C \\ 1, & \text{otherwise} \end{cases} \quad \text{[Equation 2]}$$

In Equation 2, ghostW(x,y,$I_i$) denotes a ghost weight of a pixel in a position (x, y) of a target frame $I_i$, and $P^R$ denotes a joint probability of pixels in a position (x, y) of an R channel frame.

Referring to Equation 2, when a joint probability of a detected pixel is less than a threshold C, the ghost pixel detector 135 may set a value of ghostW(x,y,$I_i$) to be '0', and may define the detected pixel as a ghost pixel. Specifically, when a joint probability of two pixels in the same position (x, y) of each channel frame is less than the threshold C, the ghost pixel detector 135 may set the value of ghostW(x,y,$I_i$) to be '0'. In other cases, the ghost pixel detector 135 may set the value of ghostW(x,y,$I_i$) to be '1'. For example, the threshold may be set to be '0.00001.' However, the threshold may be set to other values.

As described above, the ghost pixel detector 135 may detect initial ghost pixels based on the threshold. In other words, when the ghost weight has a value of '0', the ghost pixel detector 135 may define a pixel in the position (x, y) as a ghost pixel. If ghost weight has a value of '1', the ghost pixel detector 135 may define a pixel in the position (x, y) as a non-ghost pixel.

Figure 5:
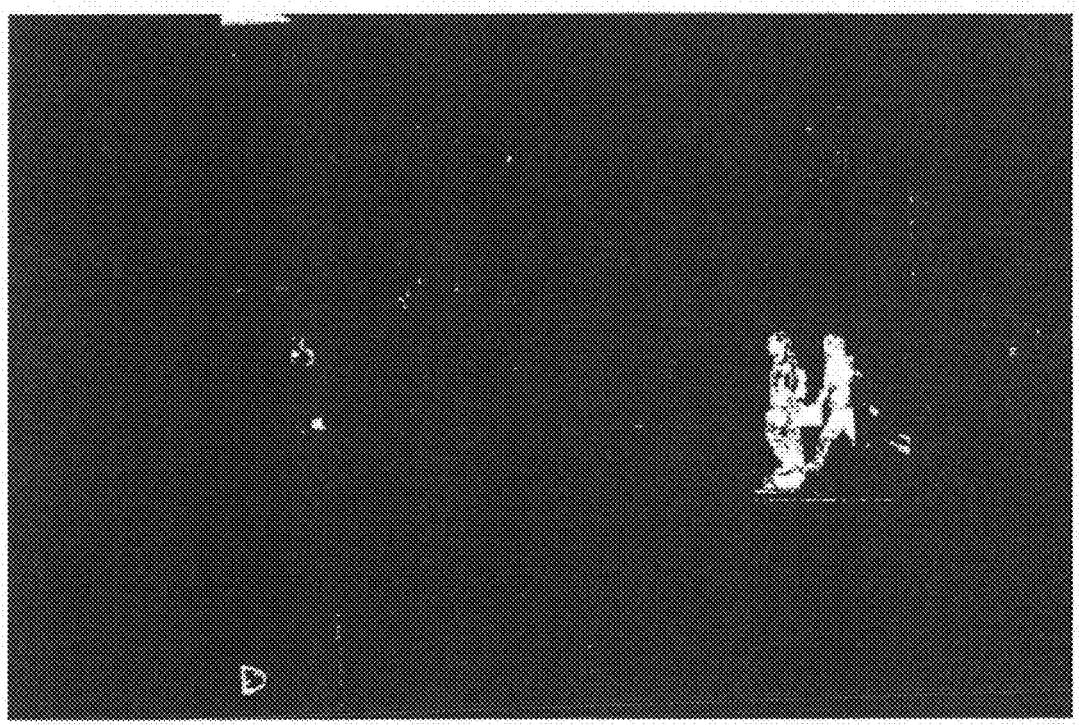
FIG. 5 illustrates an example of initial ghost pixels according to example embodiments.

FIG. 5 illustrates an example of initial ghost pixels. In FIG. 5, an initial ghost area formed with initial ghost pixels may be represented by white.

The ghost pixel detector 135 may remove a false-positive pixel from the detected initial ghost pixels, and may detect actual ghost pixels. Since the initial ghost area may be classified for each pixel, a false-positive pixel may exist due to various causes such as noise. Accordingly, the ghost pixel detector 135 may remove false-positive pixels, and may detect actual ghost pixels with greater accuracy.

Specifically, the ghost pixel detector 135 may define a global energy, may apply an energy minimization scheme to the detected initial ghost pixels, and may remove false-positive pixels. The energy minimization scheme may include, for example, a Markov Random Field (MRF) modeling scheme.

A detected ghost pixel may be determined to be a false-positive pixel based on a labeling value of '0' or '1'. Accordingly, when the entire set of labeling of ghost weights is denoted by 'f', each pixel p may have a labeling value of '0' or '1'. Specifically, $f_p \in \{0,1\}$ and $f_p=0$ may indicate that the pixels p are ghost pixels, and $f_p=1$ may indicate that the pixels p are non-ghost pixels. The total global energy may be defined by the following Equation 3:

$$E(f) = \sum_p D_p(f_p) + \sum_p \sum_{q \in N(p)} V_{pq}(f_p, f_q) \quad \text{[Equation 3]}$$

In Equation 3, E(f) denotes a global energy, and N(p) denotes a set of neighboring pixels around a pixel p. Additionally, $D_p(f_p)$ denotes a data cost, and $V_{pq}(f_p, f_q)$ denotes a smoothness cost that is a function of two neighboring pixels.

The data cost may refer to a function used to define a probability that a corresponding pixel is a ghost pixel from a ghost weight of Equation 2 calculated using a joint histogram between images. The smoothness cost may refer to a function used to determine a smoothness of pixel values between a corresponding pixel and neighboring pixels, to determine whether a noise occurs, and to add a weight when the global energy is calculated using Equation 3.

In other words, when a value of a pixel is influenced by noise, it may be difficult to determine whether the pixel is a ghost pixel. When a joint histogram is used, and when a corresponding pixel is a noise pixel, a probability of determining if the pixel is a ghost pixel may increase, thereby reducing a ghost determining performance. To prevent a reduction in the ghost determining performance, a smoothness between a pixel and neighboring pixels may be determined, and a discontinuous value may be determined as a noise. Additionally, by calculating a probability that a corresponding pixel is a ghost pixel, an accuracy of the probability may be increased by adjusting a weight.

The data cost may be defined by the following Equation 4:

$$D_p(f_p) = \begin{cases} 0, & \text{if } (f_p = 0 \wedge ghostW(x, y, I_i) = 0) \text{ or} \\ & (f_p = 1 \wedge ghostW(x, y, I_i) = 1) \\ \beta, & \text{otherwise} \end{cases} \quad \text{[Equation 4]}$$

Referring to Equation 4, $f_p$ denotes a value of a pixel in a position (x, y) of a predetermined frame, and may have a value of either '0' or '1'. The predetermined frame may be generated by forming pixels of a target frame with '0' or '1'. Additionally, $ghostW(x,y,I_i)$ denotes a ghost weight computed from a pixel in a position (x, y) of a target frame $I_i$.

The smoothness cost may be defined by the following Equation 5:

$$V_{pq}(f_p, f_q) = \lambda_{pq} \cdot \min(|f_p - f_q|, V_{max}) \quad \text{[Equation 5]}$$

In Equation 5, $$\lambda_{pq} = \begin{cases} \lambda_{large}, & \text{if } |I(p) - I(q)| < \eta \\ \lambda_{small}, & \text{otherwise.} \end{cases}$$

Additionally, in Equation 5, $V_{pq}(f_p,f_q)$ may denote an objective function defined so that pixels p and q adjacent to each other in the target frame $I_i$ may have similar intensities. $\lambda_{pq}$ denotes a weight to be added to obtain a more adaptive result when calculating the smoothness cost, and $V_{max}$ denotes a maximum value of the smoothness cost.

The above-described global energy may be minimized using a graph-cut scheme. FIG. 5 also illustrates an example of a result obtained by performing an energy optimization scheme when parameters β, $\lambda_{large}$, $\lambda_{small}$, η, and $V_{max}$ in Equations 3 through 5 are respectively defined as 25, 3, 1, 5, and 2.

The ghost pixel detector 135 may apply an energy minimization result obtained by Equations 3 through 5 to Equation 2 and may detect actual ghost pixels. Applying the energy minimization result to Equation 2 may include processing, based on the energy minimization result, ghost pixels incorrectly determined during generation of a joint histogram, as shown in FIGS. 5 and 6, and refining the joint histogram using ghost pixel information determined in FIG. 6.

Figure 6:
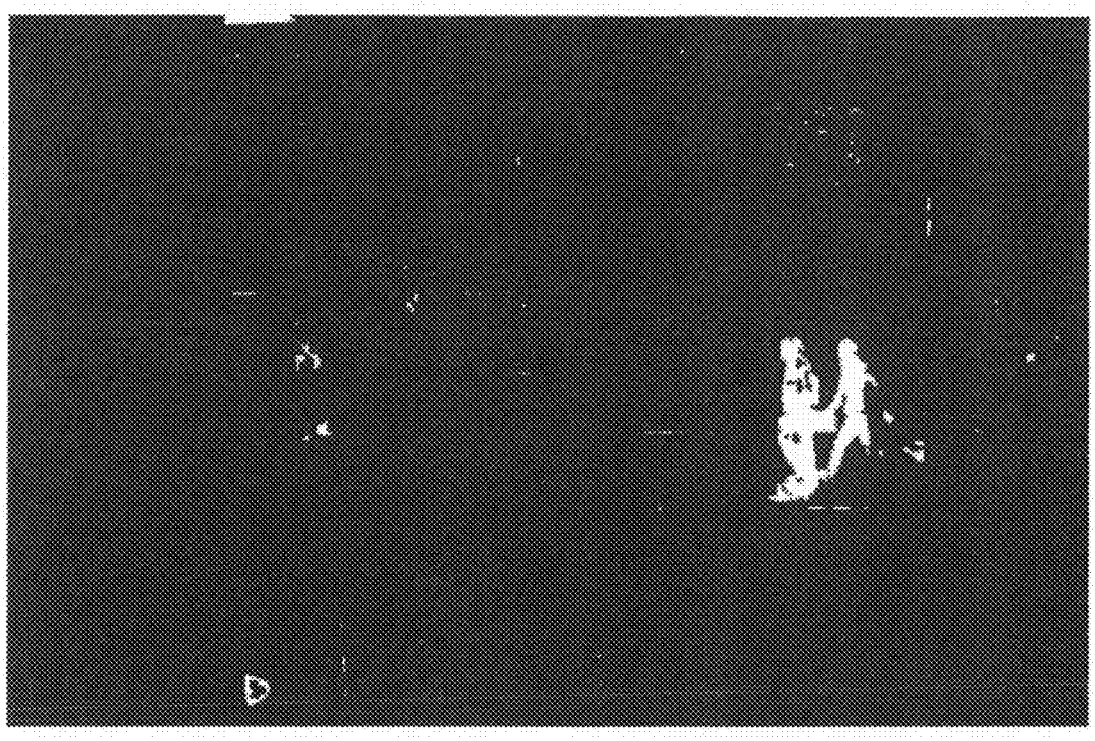
FIG. 6 illustrates an example of actual ghost pixels obtained by removing a false-positive pixel from the initial ghost pixels of FIG. 5.

FIG. 6 illustrates an example of actual ghost pixels obtained by removing false-positive pixels from the initial ghost pixels of FIG. 5. As shown in FIG. 6, a final ghost area may be re-detected from a target frame of FIG. 5 where the initial ghost pixels are already detected using the energy minimization scheme. As shown in FIG. 6, the ghost area represented in white is reduced compared to the initial ghost area shown in FIG. 5.

The local motion compensation unit 130 may detect the final ghost area from each target frame by the above-described operations. The local motion compensation unit 130 may detect a final ghost area from an R channel frame, a G channel frame and a B channel frame of each target frame.

The motion matching unit 137 may remove the detected actual ghost pixels from the target frame, and may perform matching of local motion. Specifically, the motion matching unit 137 may remove actual ghost pixels from an R channel frame, a G channel frame and a B channel frame of each target frame. Additionally, the motion matching unit 137 may match the R channel frame, the G channel frame and the B channel frame having removed the actual ghost pixels, and may generate a target frame having removed the actual ghost pixels.

When actual ghost pixels are removed from all target frames, the motion matching unit 137 may combine all the target frames, and may reconstruct a color image as an HDR image.

Figure 7:
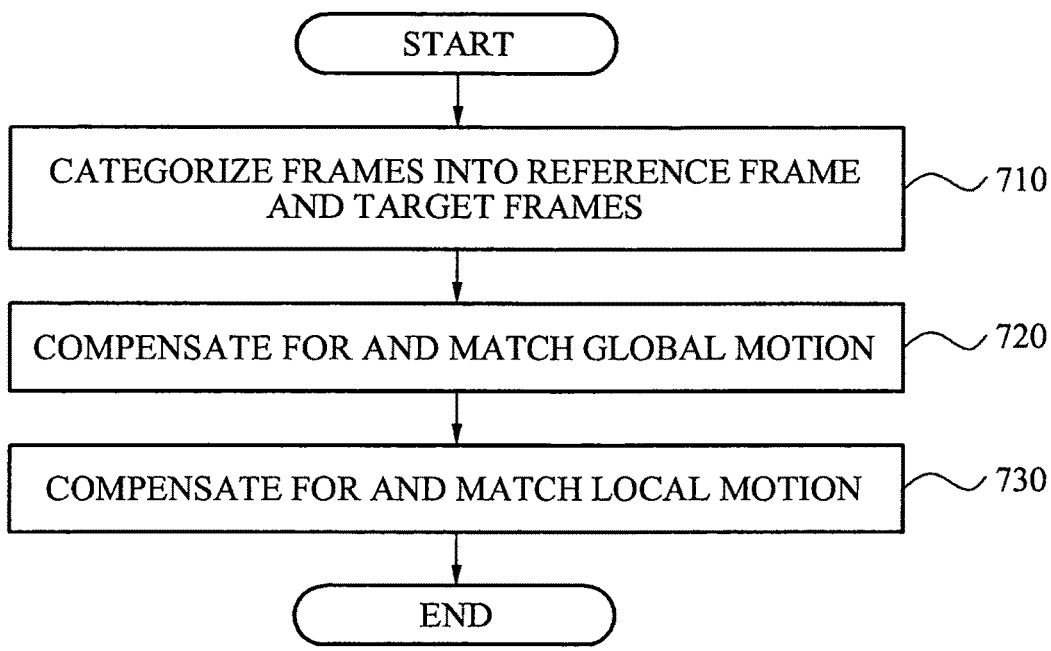
FIG. 7 illustrates a flowchart of a method of processing frames obtained by multiple exposures in a frame processing apparatus according to example embodiments.

FIG. 7 illustrates a flowchart of a method of processing frames obtained by multiple exposures in a frame processing apparatus according to example embodiments.

The method of FIG. 7 may be performed by the frame processing apparatus 100 of FIG. 1 and accordingly, detailed description of the method of FIG. 7 may be omitted herein.

In 710, the frame processing apparatus may categorize a plurality of frames into a reference frame and target frames. The plurality of frames may be obtained by a capturing apparatus continuously capturing an object with multiple exposures. The frame processing apparatus may select, as the reference frame, a frame having a best visibility among the plurality of frames, and may set other frames as target frames.

In 720, the frame processing apparatus may compensate for and match a global motion that is caused by a motion of the capturing apparatus that captures the object. For example, the frame processing apparatus may estimate global motion using an MTB image, and may perform global image matching based on the estimated global motion.

In 730, the frame processing apparatus may compensate for and match local motion that is caused by a motion of the object, based on a joint histogram between the reference frame and the target frames. In other words, the frame processing apparatus may compensate for a vibration occurring in a local area by the motion of the object in each of the target frames.

Therefore, the frame processing apparatus may output frames which are recognized as if the frames are obtained by continuously capturing a stationary object and the frame processing apparatus operates as if both the capturing apparatus and the object are not in motion.

Figure 8:
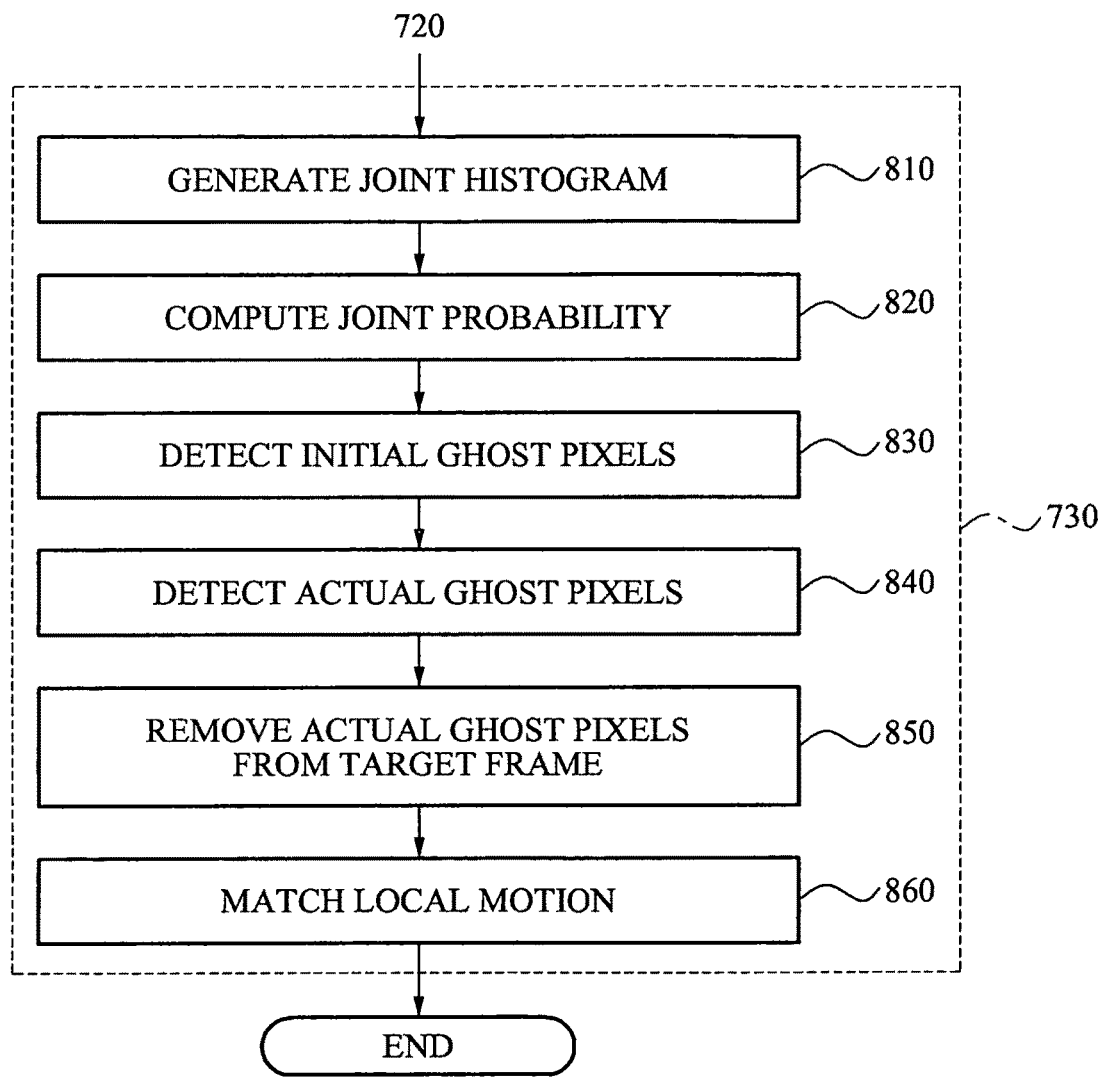
FIG. 8 further illustrates a flowchart of an operation of compensating for and matching local motion in the method of FIG. 7.

FIG. 8 further illustrates a flowchart of 730 of the method of FIG. 7.

In 810, the frame processing apparatus may generate a joint histogram of intensity between the reference frame and the target frame using Equation 1. The frame processing apparatus may generate a joint histogram for each intensity of the R channel frame, the G channel frame and the B channel frame. Specifically, the frame processing apparatus may divide the target frames into the R channel frame, the G channel frame and the B channel frame, and may generate a joint histogram for each intensity of the R channel frame, the G channel frame and the B channel frame.

In 820, the frame processing apparatus may normalize the joint histogram generated in 810, and may compute a joint probability of the target frame for each pixel. Specifically, the frame processing apparatus may perform the Parzen window operation with respect to each of the R channel frame, the G channel frame and the B channel frame, may perform the normalization operation, and may compute a joint probability.

In 830, the frame processing apparatus may compare the joint probability computed in 820 to a threshold set in advance, and may detect initial ghost pixels from the target frame. Specifically, the frame processing apparatus may detect initial ghost pixels from each of the R channel frame, the G channel frame and the B channel frame. The frame processing apparatus may detect the initial ghost pixels using Equation 2.

In 840, the frame processing apparatus may detect actual ghost pixels using the energy minimization scheme. Specifically, the frame processing apparatus may apply the energy minimization scheme to the initial ghost pixels detected in 830, and may remove false-positive pixels, so that actual ghost pixels may be detected. Equations 3 through 5 may be used to detect actual ghost pixels.

In 850, the frame processing apparatus may remove the actual ghost pixels detected in 840 from the target frames. Specifically, the frame processing apparatus may remove actual ghost pixels detected from each of the R channel frame, the G channel frame and the B channel frame that constitute the target frames.

In 860, the frame processing apparatus may match the R channel frame, the G channel frame and the B channel frame having removed the actual ghost pixels, and may generate a target frame having removed the actual ghost pixels.

When actual ghost pixels are removed from all target frames, the frame processing apparatus may combine all the target frames, and may reconstruct a color image such as an HDR image.

To effectively remove a ghost phenomenon, the frame processing apparatus 100 may detect ghost pixels based on the joint histogram, and may then apply the ghost pixels to the energy minimization scheme, thereby more accurately detecting actual ghost pixels. Accordingly, the frame processing apparatus 100 may more accurately remove the ghost areas during HDR processing, and may effectively prevent a ghost blur phenomenon from occurring due to motion of the object.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although example embodiments have been shown and described, it should be appreciated by those skilled in the art that changes may be made in these example embodiments without departing from the principles and spirit of the disclosure, the scope of which is defined in the claims and their equivalents.

What is claimed is:

1. A method of processing frames obtained by multiple exposures, the method comprising:
    categorizing, by at least one processor, a plurality of frames into one of a reference frame and a target frame, the plurality of frames captured by multiple exposures;
    compensating for global motion resulting from motion of a capturing apparatus capturing an object; and compensating for local motion based on a joint histogram of an intensity between the reference frame and the target frame, the local motion resulting from motion of the object, wherein the joint histogram is obtained by accumulating a number of pairs of intensity values of pixels at a same location in the reference frame and the target frame, wherein the compensating for the local motion comprises: generating the joint histogram of an intensity between the reference frame and the target frame; normalizing the generated joint histogram and computing a joint probability of the target frame for each pixel; and comparing the computed joint probability to a threshold and detecting ghost pixels, wherein the comparing of the computed joint probability comprises defining ghost pixels only when the computed joint probability is less than the threshold.

2. The method of claim 1 wherein the normalizing of the generated joint histogram comprises dividing the number of pairs of intensity values by a pixel size of the reference frame, and computing the joint probability.

3. The method of claim 1, wherein the compensating for the local motion further comprises: removing a false-positive pixel from the detected ghost pixels and detecting an actual ghost pixel; and removing the detected actual ghost pixel from the target frame and compensating for the local motion.

4. The method of claim 1, wherein the compensating for the local motion comprises dividing the target frame into an R channel frame, a G channel frame, and a B channel frame, and compensating for the local motion based on a joint histogram for the R channel frame, the G channel frame, and the B channel frame.

5. The method of claim 1, wherein the categorizing the plurality of frames comprises selecting, as the reference frame, one of a frame corresponding to an intermediate exposure among the multiple exposures, a frame having an intensity value closest to a median intensity value of an average intensity value of the frames, and a frame having a largest entropy among the frames.

6. The method of claim 1, wherein the compensating for the global motion comprises compensating for the global motion existing between the frames, and matching the frames together.

7. At least one non-transitory computer readable recording medium comprising computer readable instructions that control at least one processor to implement the method of claim 1.

8. An apparatus processing frames obtained by multiple exposures, the apparatus comprising:
a processor, comprising; a categorization unit to categorize a plurality of frames into one of a reference frame and a target frame, the plurality of frames captured by multiple exposures; a global motion compensation unit to compensate for global motion resulting from motion of a capturing apparatus capturing an object; and a local motion compensation unit to compensate for local motion based on a joint histogram of an intensity between the reference frame and the target frame, the local motion resulting from motion of the object, wherein the joint histogram is obtained by accumulating a number of pairs of intensity values of pixels at a same location in the reference frame and the target frame, wherein the local motion compensation unit comprises: a histogram generator to generate the joint histogram of an intensity between the reference frame and the target frame; a probability computation unit to normalize the generated joint histogram and to compute a joint probability of the target frame for each pixel; and a ghost pixel detector to compare the computed joint probability to a threshold and to detect ghost pixels, and wherein the ghost pixel detector defines a computed pixel as a ghost pixel only when the computed joint probability is less than the threshold.

9. The apparatus of claim 8, wherein the probability computation unit divides the number of pairs of intensity values by a pixel size of the reference frame, and computes the joint probability.

10. The apparatus of claim 8, wherein the ghost pixel detector removes a false-positive pixel from detected ghost pixels and detects an actual ghost pixel; and wherein the local motion compensation unit further comprises a motion matching unit to remove the detected actual ghost pixel from the target frame and to match the local motion.

11. The apparatus of claim 8, wherein the local motion compensation unit divides the target frame into an R channel frame, a G channel frame, and a B channel frame, and compensates for the local motion based on a joint histogram for the R channel frame, the G channel frame, and the B channel frame.

12. The apparatus of claim 8, wherein the categorization unit selects, as the reference frame, one of a frame corresponding to an intermediate exposure among the multiple exposures, a frame having an intensity value closest to a median intensity value of an average intensity value of the frames, and a frame having a largest entropy among the frames.

13. The apparatus of claim 8, wherein the global motion compensation unit compensates for the global motion existing between the frames, and matches the frames together.

* * * * *